United States Patent
Yousfi et al.

(10) Patent No.: US 11,407,052 B2
(45) Date of Patent: Aug. 9, 2022

(54) METHOD FOR CONNECTING TWO INDIVIDUAL ELEMENTS OF AN UNDERWATER FLUID-TRANSPORT PIPE SUBJECT TO FATIGUE

(71) Applicant: SAIPEM S.A., Montigny le Bretonneux (FR)

(72) Inventors: Rachid Yousfi, Peschiera Borromeo (IT); Stefan Dobre, Bucharest (RO)

(73) Assignee: SAIPEM S.A., Montigny le Bretonneux (FR)

( * ) Notice: Subject to any disclaimer, the term of this patent is extended or adjusted under 35 U.S.C. 154(b) by 886 days.

(21) Appl. No.: 16/315,111

(22) PCT Filed: Jun. 20, 2017

(86) PCT No.: PCT/FR2017/051627
§ 371 (c)(1),
(2) Date: Jan. 3, 2019

(87) PCT Pub. No.: WO2018/007709
PCT Pub. Date: Jan. 11, 2018

(65) Prior Publication Data
US 2019/0247945 A1    Aug. 15, 2019

(30) Foreign Application Priority Data
Jul. 6, 2016 (FR) ...................... 1656458

(51) Int. Cl.
*B23K 9/028* (2006.01)
*B23K 9/23* (2006.01)
(Continued)

(52) U.S. Cl.
CPC .......... *B23K 9/0286* (2013.01); *B23K 9/0026* (2013.01); *B23K 9/0061* (2013.01);
(Continued)

(58) Field of Classification Search
CPC ............ B23K 2101/06; B23K 2101/10; B23K 2103/04; B23K 37/08; B23K 9/0026;
(Continued)

(56) References Cited

U.S. PATENT DOCUMENTS 4,049,186 A * 9/1977 Hanneman ............. B23K 9/048
219/76.12
4,624,402 A   11/1986 Pitcairn et al.
(Continued)

FOREIGN PATENT DOCUMENTS

CN    202291876 U    7/2012
CN    102759537      10/2012
(Continued)

*Primary Examiner* — Dana Ross
*Assistant Examiner* — James F Sims, III
(74) *Attorney, Agent, or Firm* — Cozen O'Connor

(57) ABSTRACT

A method of connecting together two unit elements (2, 4) of an undersea fluid transport pipe that is subjected to fatigue, by welding together two metallic or bi-metallic unit pipe elements that have been put into abutment via their respective free ends (2a, 4a), the welding being done by making three distinct weld beads (6, 8, 10), with a last weld bead (8) being deposited between two lateral first weld beads (6, 10), and being followed directly by controlled sanding of the weld beads in order to apply compression stresses on them.

6 Claims, 1 Drawing Sheet

(51) Int. Cl.
  *C21D 9/50* (2006.01)
  *F16L 13/02* (2006.01)
  *B23K 9/16* (2006.01)
  *B23K 9/00* (2006.01)
  *B23K 9/18* (2006.01)
  *B23K 37/08* (2006.01)
  *B24C 1/04* (2006.01)
  *E21B 17/08* (2006.01)
  *B23K 101/10* (2006.01)
  *B23K 103/04* (2006.01)
  *B23K 101/06* (2006.01)
  *C21D 7/04* (2006.01)
  *E21B 17/01* (2006.01)

(52) U.S. Cl.
  CPC .............. *B23K 9/0282* (2013.01); *B23K 9/16* (2013.01); *B23K 9/18* (2013.01); *B23K 9/23* (2013.01); *B23K 37/08* (2013.01); *B24C 1/04* (2013.01); *C21D 9/50* (2013.01); *E21B 17/085* (2013.01); *F16L 13/02* (2013.01); *F16L 13/0272* (2013.01); *B23K 2101/06* (2018.08); *B23K 2101/10* (2018.08); *B23K 2103/04* (2018.08); *C21D 7/04* (2013.01); *E21B 17/01* (2013.01)

(58) Field of Classification Search
  CPC .. B23K 9/0061; B23K 9/0282; B23K 9/0286; B23K 9/16; B23K 9/18; B23K 9/23; B24C 1/04; C21D 7/04; C21D 9/50; E21B 17/01; E21B 17/085; F16L 13/02; F16L 13/0272
  USPC ...................................................... 219/60 R
  See application file for complete search history.

(56) References Cited

U.S. PATENT DOCUMENTS

| | | | |
|---|---|---|---|
| 8,522,827 B2* | 9/2013 | Lazzara | F16L 58/1063 138/172 |
| 2001/0017232 A1 | 8/2001 | Hogeboom et al. | |
| 2001/0017292 A1* | 8/2001 | Belloni | B23K 9/0286 219/60 R |
| 2009/0065556 A1* | 3/2009 | Finton | B23K 9/0286 228/262.1 |
| 2010/0147047 A1 | 6/2010 | Kerdiles et al. | |
| 2010/0159699 A1* | 6/2010 | Takahashi | B24C 1/04 438/693 |
| 2015/0004426 A1* | 1/2015 | Nagata | C22C 38/04 228/104 |
| 2015/0084333 A1 | 3/2015 | Prigent et al. | |
| 2017/0182605 A1 | 6/2017 | Rajagopalan et al. | |

FOREIGN PATENT DOCUMENTS

| | | |
|---|---|---|
| CN | 105149744 | 12/2015 |
| CN | 105252116 | 1/2016 |
| CN | 105583498 | 5/2016 |
| DE | 195 27 634 | 1/1997 |
| GB | 2 462 149 | 2/2010 |
| WO | WO 2008/139116 | 11/2008 |

* cited by examiner

METHOD FOR CONNECTING TWO INDIVIDUAL ELEMENTS OF AN UNDERWATER FLUID-TRANSPORT PIPE SUBJECT TO FATIGUE

PRIORITY CLAIM

This is a U.S. national stage of application No. PCT/FR2017/051627, filed on Jun. 20, 2017. Priority is claimed on France Application No.: FR1656458, filed Jul. 6, 2016, the content of which is incorporated herein by reference.

BACKGROUND OF THE INVENTION

The present invention relates to the general field of undersea fluid transport pipes that are subjected to fatigue while in operation. The invention relates more particularly pipes for transferring hydrocarbons, e.g. oil or gas, providing a bottom-to-surface connection or else a connection between two floating supports.

Bottom-to-surface connection pipes or pipes for providing connections between two floating supports used for transferring hydrocarbons, referred to herein as "risers", are typically made by taking pipes that have previously been laid on the sea bottom, and then raising them continuously directly towards a floating support, e.g. by giving them a catenary configuration.

Pipes that are thus raised from the bottom in order to form risers need to be made using pipes that are flexible when the depth of water is less than a few hundreds of meters. Nevertheless, once the depth of water reaches or exceeds 800 meters (m) to 1000 m, flexible pipes are replaced by rigid pipes made up of pipe elements of unit length that are made out of a strong material, such as thick steel, and that are welded together. Rigid risers, in a catenary configuration and made out of strong material, are commonly referred to as "steel catenary risers" (SCRs).

The unit elements of a pipe that is subsequently used as a rigid riser are connected to one another on board a laying ship and they are lowered to the sea bottom progressively as they are connected together. This laying may be performed by using a J-lay or an S-lay tower positioned on the laying ship. With J-laying, the undersea pipe is typically lowered from the laying ship while it is practically vertical (at an angle in the range +30° to −10° relative to the vertical). J-laying is single-catenary laying in which the almost vertical angle of inclination of the pipe decreases progressively as it moves downwards until it takes on the slope of the sea bottom. With S-laying, the undersea pipe is typically lowered from the laying ship while it is practically horizontal and it curves subsequently in order to reach the sea bottom.

The J-lay and S-lay techniques require each new unit pipe element to be connected to the undersea pipe on board the laying ship prior to being lowered into the sea, while the laying ship is moved forwards by an amount corresponding to the length of the unit pipe element. This connection step is performed by butt welding the free end of the new steel unit pipe element to the free end of the steel undersea pipe that has already been assembled and lowered into the sea.

Furthermore, unit pipe elements are generally coated in the factory in a protective coating, e.g. made on the basis of epoxy resin, with the exception of their free ends, which are left free of any such coating so that the coating is not burnt by the heat given off during welding. While being connected together on the laying ship, the free ends of the undersea pipe and of the new unit pipe element for assembling thereto are welded together. Once these ends have been welded together, the weld bead is typically eliminated by a grinding operation, and then a coating based on epoxy resin is applied by melting both on the weld bead as ground flat in this way and on the respective connected ends of the unit pipe element and of the undersea pipe so as to reconstruct the protective coating over the entire length of the pipe. Prior to applying the coating by melting, it is necessary to perform an operation of sanding the surfaces of the pipe in order to obtain a rough surface state for the steel so as to improve adhesion of the protective coating on the pipe.

Grinding the weld bead is a particularly important step when connecting a new unit pipe element to the undersea pipe, since it makes it possible to eliminate any geometrical discontinuities in the vicinity of the weld bead, which might give rise to cracking. Specifically, rigid risers are pipes that are subjected to high levels of dynamic stress and to large amounts of deformation that make it necessary to guarantee they have good fatigue strength. However, fatigue strength generally requires great strength against cracking at the welds made between the various unit elements of the pipe. Furthermore, once the weld bead has been ground, it is common practice to act manually to inspect the result that has been obtained (by using an ultrasound probe) in order to verify that all geometrical discontinuities have been eliminated and in order to inspect the weld at this location so as to ensure that it does indeed satisfy the quality criteria of welding standards.

Such a connection method presents certain drawbacks. In particular, its grinding and inspection consume a relatively long length of time in order to be performed (close to 20 minutes per weld). Furthermore, the result that is obtained after grinding is not always acceptable. In particular, inspection may reveal that the weld bead was damaged during the grinding or that it does not satisfy the quality criteria of welding standards, which means that it is necessary to remake the weld bead.

A method is also known from Document WO 2008/139116 for connecting together two steel unit elements of a pipe, in which method a localized peening operation is performed inside the pipe in order to increase the compression of the steel in the vicinity of the weld beads. Although reliable in terms of fatigue strength at weld beads, such a peening operation is relatively difficult to perform and requires suitable peening tools to be used inside the pipe.

OBJECT AND SUMMARY OF THE INVENTION

A main object of the present invention is to propose a connection method that does not present the above-mentioned drawbacks.

In accordance with the invention, this object is achieved by a method of connecting together two unit elements of an undersea fluid transport pipe that is subjected to fatigue, the method comprising welding together two metallic or bi-metallic unit pipe elements that have been put into abutment via their respective free ends, the welding being done by making three distinct weld beads, with a last weld bead being deposited between two lateral first weld beads, and being followed directly by controlled sanding of the weld beads in order to apply compression stresses on them.

Surprisingly, the inventors have found that having recourse to three weld beads followed directly by controlled sanding of the beads makes it possible to provide compression stresses in the weld beads that retard initiation and propagation of cracks due to the fatigue to which the pipe is subjected. Having recourse to two weld beads that are each beside the unit elements that are for connecting together, followed by a third weld bead between the first two, and followed directly by sanding also makes it possible to obtain compression stresses that avoid having recourse to any grinding operation (the method of the invention does not include any operation of grinding the weld bead) and improves considerably the fatigue lifetime of the assembly, by a minimum of 300%.

The welding may be performed with the unit pipe elements in a vertical position, with the last weld bead being deposited between the first two lateral weld beads.

Preferably, the sanding further includes sanding the connected-together ends of the unit pipe elements. This makes it possible to obtain a rough surface state for the material constituting the pipe, regardless of whether that material is steel, aluminum, or titanium, thereby improving subsequent adhesion of the protective coating on the pipe.

After the sanding, the method may also include applying a coating based on epoxy resin by melting both on the weld beads and also on the connected-together ends of the unit pipe elements.

BRIEF DESCRIPTION OF THE DRAWING

Other characteristics and advantages of the present invention appear from the following description made with reference to the accompanying drawing, which shows an implementation having no limiting character. In the figures.

DETAILED DESCRIPTION OF THE INVENTION

The invention applies to connecting together two unit elements of an undersea pipe that is subjected to fatigue and that is used for transporting fluid such as hydrocarbons, e.g. oil or gas from undersea production wells.

A field of application of the invention is that of pipes laid on the seabed and raised to the surface in order to be used as a rigid risers, i.e. as bottom-to-surface connections or as connections between two floating supports. By way of example, the term "floating support" is used to cover a floating, production, storage, and offloading (FPSO) unit.

The pipes used as a rigid risers are typically made from metal unit pipe elements that are connected together by welding (and made of a material that is not limited to steel). More precisely, the unit elements of a pipe that is subsequently used as a rigid riser are connected to one another on board a laying ship and they are lowered to the sea bottom progressively as they are connected together. This laying may be performed by using a J-lay tower or an S-lay tower positioned on the laying ship.

Figure 1:
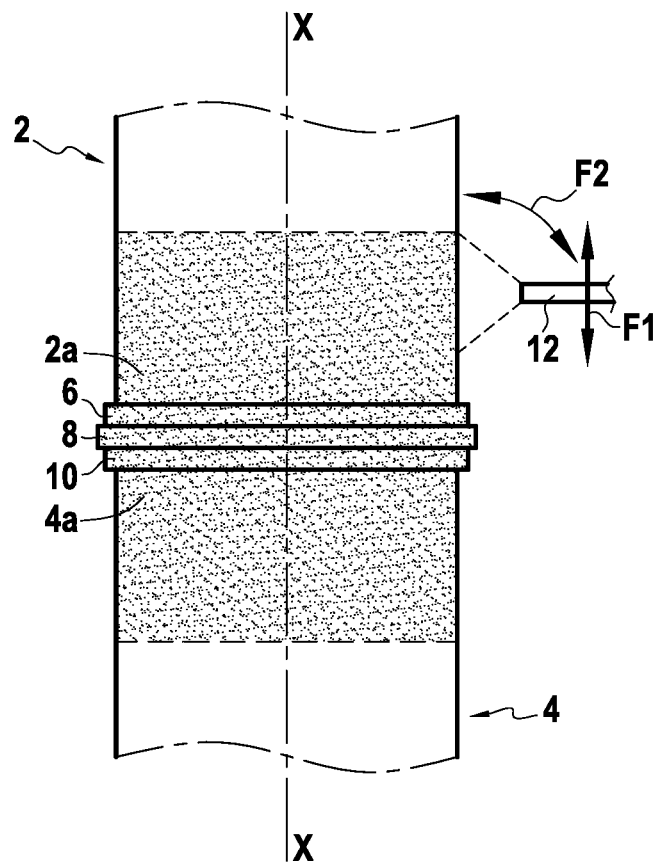
FIG. 1 is a profile view of two unit pipe elements connected together by the method in accordance with the invention.

The connection of the invention between two unit elements 2, 4 of such a pipe on board a laying ship is shown diagrammatically in FIG. 1.

During J-laying or S-laying, the two steel alloy unit pipe elements 2 and 4 are in a vertical position. They are put into abutment, aligning their respective free ends 2a, 4a along a common vertical axis X-X. Three distinct weld beads 6, 8, and 10 are then made between these two free ends.

The weld beads 6, 8, and 10 are made from the outside of the pipe by any known technique for welding together two tubular elements made of steel alloy. By way of example, it is possible to use an electric arc welding technique. The material used for making the weld bead may typically be compatible with any grade of steel.

Figure 2:
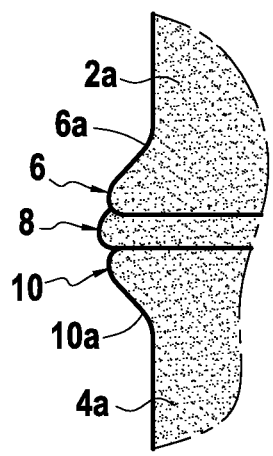
FIG. 2 is a section view of FIG. 1 showing the weld beads.

The three weld beads 6 to 10 are made in the following order: the first two passes are performed to form of the lateral weld beads (beads 6 and 10 in FIGS. 1 and 2), i.e. the beads beside the respective free ends 2a and 4a of the unit pipe elements, and then the last pass is performed to form a last weld bead (weld bead 8 in the figures) between the lateral first two weld beads 6 and 10.

The last weld bead 8, which is made between the first two passes, thus serves to raise the temperature of the two lateral weld beads 6 and 10 that will have tended to cool down. As a result, by heating the lateral weld beads 6 and 10 in symmetrical manner, it is possible to reduce the hardnesses of the first weld beads at the free ends 2a and 4a of the two unit pipe elements.

Once the weld beads 6 to 10 have been made and have cooled down, the connection method of the invention provides for performing directly a controlled sanding operation on these weld beads, and also on the connected-together ends of the unit pipe elements. In particular, no step of grinding or of any other type of mechanical cutting is performed on the weld beads.

The sanding is performed by any known technique. For example, it is possible to use one or more projection nozzles 12 that are suitable for moving in translation along the vertical axis X-X (movement referenced F1 in FIG. 1) and for turning about this axis (movement referenced F2 in FIG. 1).

The purpose of the sanding is specifically to prepare the surfaces of the connected-together ends of the unit pipe elements so as to obtain a rough surface state for the steel, which improves subsequent adhesion of a protective coating on the pipe (in particular by applying an epoxy resin based coating by melting). Surprisingly, by being performed in controlled manner on of the weld beads 6 to 10, the sanding also makes it possible to provide compression stresses on these weld beads that retard initiation and propagation of cracks due to the fatigue to which the pipe is subjected.

In practice, the sanding is performed using the same projection parameters (abrasive and projection nozzles) both for the connected-together ends of the unit pipe elements and also for the weld beads, with the exception of the duration of projection, which is longer for sanding the weld beads than for sanding the connected-together ends of the unit pipe elements.

There follows a description of an implementation of the connection method of the invention.

In this implementation, the unit pipe elements are made out of a bi-metallic tube comprising API 5L -X65 steel on the outside and Inconel® 625 steel (a nickel-chromium alloy with added molybdenum and niobium) on the inside, the material used for making the three weld beads also being Inconel® 625.

By way of example, the sanding treatment performed directly after making the weld beads is performed using Profilium® 58 as the abrasive. Profilium® 58 is a shot peening abrasive sold by the supplier "W Abrasives". This abrasive presents the following chemical composition: $C \geq 0.85\%$; $Si \geq 0.4\%$; $0.6\% \leq Mn \leq 1.2\%$; $S \leq 0.05\%$; and $P \leq 0.05\%$. It presents hardness greater than 64 on the Rockwell C hardness scale (HRc) and a minimum specific gravity of 7.4.

With such sanding treatment, a considerable improvement (of at least 300%) has been observed in the fatigue lifetime of the assembly of two unit pipe elements (compared with an assembly involving a grinding operation).

Once the sanding operation has been performed, provision is advantageously made to apply a protective coating (in particular against corrosion), e.g. a coating formed on the basis of epoxy resin, onto the connected-together ends of the unit pipe elements and onto the weld beads.

Typically, such a coating is deposited by melting both on the weld beads and also on the connected-together ends of the unit pipe elements in order to reconstitute the protective coating over the entire length of the pipe.

The invention claimed is:

1. A method of connecting together two unit elements of an undersea fluid transport pipe that is subjected to fatigue, the method comprising welding together two metallic or bi-metallic unit pipe elements that have been put into abutment via their respective free ends, the welding being done by making three distinct weld beads, beginning with two lateral first weld beads that are deposited beside the respective free ends of the unit elements, followed by a last weld bead being deposited between the two lateral first beads, and being followed directly by controlled sanding of the weld beads in order to apply compression stresses on them.

2. The method according to claim 1, wherein grinding of the weld beads is not performed.

3. The method according to claim 1, wherein the welding is performed while the unit pipe elements are in a vertical position.

4. The method according to claim 1, wherein the sanding further includes sanding the connected-together ends of the unit pipe elements.

5. The method according to claim 4, wherein the sanding is performed on the connected-together ends of the unit pipe elements and on the weld beads using the same abrasive projected from a common nozzle, the duration for which the abrasive is projected onto the weld beads being longer than the duration for which the abrasive is projected onto the connected-together ends of the unit pipe elements.

6. The method according to claim 1, further comprising, after the sanding, applying a coating based on epoxy resin by melting on the weld beads and also on the connected-together ends of the unit pipe elements.

* * * * *